(12) United States Patent
Dell'Eva et al.

(10) Patent No.: US 7,486,996 B2
(45) Date of Patent: Feb. 3, 2009

(54) TRANSMISSION CONTROL UNIT HAVING PRESSURE TRANSDUCER PACKAGE

(75) Inventors: Mark Louis Dell'Eva, Grand Blanc, MI (US); Timothy John Green, Holly, MI (US)

(73) Assignee: Eaton Corporation, Cleveland, OH (US)

( * ) Notice: Subject to any disclaimer, the term of this patent is extended or adjusted under 35 U.S.C. 154(b) by 491 days.

(21) Appl. No.: 11/235,726

(22) Filed: Sep. 26, 2005

(65) Prior Publication Data

US 2007/0072726 A1   Mar. 29, 2007

(51) Int. Cl.
G05B 11/01 (2006.01)
B29C 45/00 (2006.01)
F16H 31/00 (2006.01)

(52) U.S. Cl. .................. 700/19; 700/203; 475/116; 475/120

(58) Field of Classification Search ............ 700/19, 700/203; 475/120, 116
See application file for complete search history.

(56) References Cited

U.S. PATENT DOCUMENTS

| | | | | |
|---|---|---|---|---|
| 4,688,449 A | * | 8/1987 | Harada et al. | 475/129 |
| 5,109,733 A | * | 5/1992 | Ishikawa et al. | 475/120 |
| 5,245,893 A | * | 9/1993 | Koenig et al. | 477/120 |
| 5,289,741 A | * | 3/1994 | Debs et al. | 475/123 |
| 5,434,779 A | * | 7/1995 | Vukovich et al. | 701/58 |
| 6,319,164 B1 | * | 11/2001 | Runde et al. | 475/116 |
| 6,530,856 B1 | | 3/2003 | Kakiage | |
| 6,687,642 B2 | | 2/2004 | Maher | |
| 6,807,472 B2 | | 10/2004 | Ford | |
| 6,883,874 B2 | * | 4/2005 | McCurdy et al. | 303/7 |
| 7,004,872 B2 | * | 2/2006 | Suzuki et al. | 475/116 |
| 7,220,206 B2 | * | 5/2007 | Borgerson et al. | 475/116 |
| 2001/0018380 A1 | | 8/2001 | Fritzsche | |
| 2002/0088304 A1 | | 7/2002 | Thorum | |
| 2004/0118466 A1 | * | 6/2004 | Ford et al. | 137/884 |
| 2005/0070205 A1 | * | 3/2005 | Korovin et al. | 451/5 |

FOREIGN PATENT DOCUMENTS

EP          1 462 681 A     9/2004
WO    WO 00/30909 A    6/2000

OTHER PUBLICATIONS

EP Search Report, EP 06019992.4-2421 search completed Jan. 26, 2007.

* cited by examiner

*Primary Examiner*—Thomas K Pham
*Assistant Examiner*—Ronald D Hartman, Jr.
(74) *Attorney, Agent, or Firm*—Anna M. Shih

(57) ABSTRACT

Pressure transducers are incorporated as part of a transmission control unit TCU rather than placed in a remote location. This configuration eliminates the need to link the pressure transducers to the TCU via a long electrical connection, thereby shortening the signal path of the low-level signals output from the pressure transducers and reducing the complexity of the overall system. The transducers may be disposed either directly or on supports having support ports that align with pressure ports in the manifold to form fluidic paths between the manifold and the transducer.

21 Claims, 7 Drawing Sheets

TRANSMISSION CONTROL UNIT HAVING PRESSURE TRANSDUCER PACKAGE

TECHNICAL FIELD

The present invention relates to automatic shifting speed change transmissions employed in motor vehicles where electrically operated solenoid valves are controlled by an electronic computer for controlling the flow of pressurized fluid to transmission shift actuators employed in the transmission shifting operation.

BACKGROUND OF THE INVENTION

Electronically controlled solenoid operated valves provide improved shifting capabilities for the transmission compared to hydro-mechanical shift control and, in particular, permits staged or progressive release and application of clutches, such as band clutches and/or plate clutches, for effecting smoother speed changes in the transmission. In currently-known production transmissions, these valve assemblies are mounted internally on the transmission valve body and supplied with pressurized fluid from a pump disposed in the transmission. Shifting is performed using open loop control of the valves, which requires time-consuming and costly calibration of each valve in the transmission system. However, as the valves wear over time and as the viscosity of the transmission fluid changes due to age and contamination, the transmission system moves away from its initial calibration conditions, reducing the shifting performance of the transmission.

Closed loop control of solenoid operated valves has been proposed as a way to obviate the need for precise calibration of the solenoid pilot and regulating valves used for clutch engagement and line pressure regulation in an automatic speed change transmission. Preferably, closed loop control includes providing a feedback signal that indicates the torque transmitted by a particular shifting clutch band or plate to the solenoid valve. U.S. Pat. No. 6,807,472 describes a system that allows closed loop control of a transmission system by using pressure sensors to sense the hydraulic pressure to each clutch actuator and provide an electrical signal to a transmission control unit (TCU) corresponding to the sensed pressure. The TCU then determines the difference between the actual sensed pressure and a target pressure corresponding to the desired output pressure to the actuators. The TCU controls the current level or the duty-cycle sent to either a linear or pulse-width-modulated (PWM) solenoid-operated valve to control the clutch regulator valve or the clutch actuator directly until the actual pressure reaches the target pressure. This closed loop feedback ensures that the shift actuators provide smooth transmission shifting operation, even with temperature changes, valve wear, and transmission fluid contamination.

Piezoelectric pressure transducers are often a preferred choice in many sensing applications because of their low cost, but they pose numerous design challenges due to their non-linear response, low output signal strength, and temperature sensitivity. Thus, using piezoelectric pressure transducers requires signal amplification and correction for non-linearities. Corrections may be carried out by, for example, mixed-signal ASICs. Further, the pressure transducers must be positioned so that current can be carried from the TCU to the solenoid valves and that signals can be carried from the pressure transducers back to the TCU to effect control of valves based on the pressure transducer signals.

Placing discrete, isolated, single transducers in a transmission system having a signal communication interface, such as a lead frame, stamped metal traces, flex-circuits, plated circuits, a wire harness, wireless means, etc. to carry current and signals between the TCU, solenoid valves, and transducers increases the overall complexity of the system and also exposes the transducers to current spikes from the solenoids in the valves. Because the transducers output low-level signals, the noise generated by the current spikes will create unacceptable signal errors.

There is a desire for a transmission control unit that incorporates low-cost pressure transducers while reducing noise sensitivity and complexity.

SUMMARY OF THE INVENTION

The invention is generally directed to a TCU having a package containing a plurality of pressure transducers for pressure detection. The package includes one or more pressure transducers and a microprocessor, microcontroller, or state-machine incorporated into a single package. The package provides pressure sensing and control in a transmission system via a single device that can be easily incorporated in the transmission system. In one example, the package can be attached to the TCU in one step, connecting multiple pressure transducers to the system, instead of individually linking each pressure transducer from a remote location to the TCU. The package can shorten the signal communication path of the low-level signals output from the pressure transducer and reduces the complexity of the overall transmission system.

The package may be configured to have its own ports that align with pressure ports in the manifold to form fluidic paths between the manifold and the transducer. This allows the package to act as an adapter plate that can be retrofitted to an existing manifold system. As a result, the enhanced performance provided by the package can be easily provided in both new TCU designs and pre-existing TCU designs.

DETAILED DESCRIPTION OF THE INVENTION

Figure 1A:
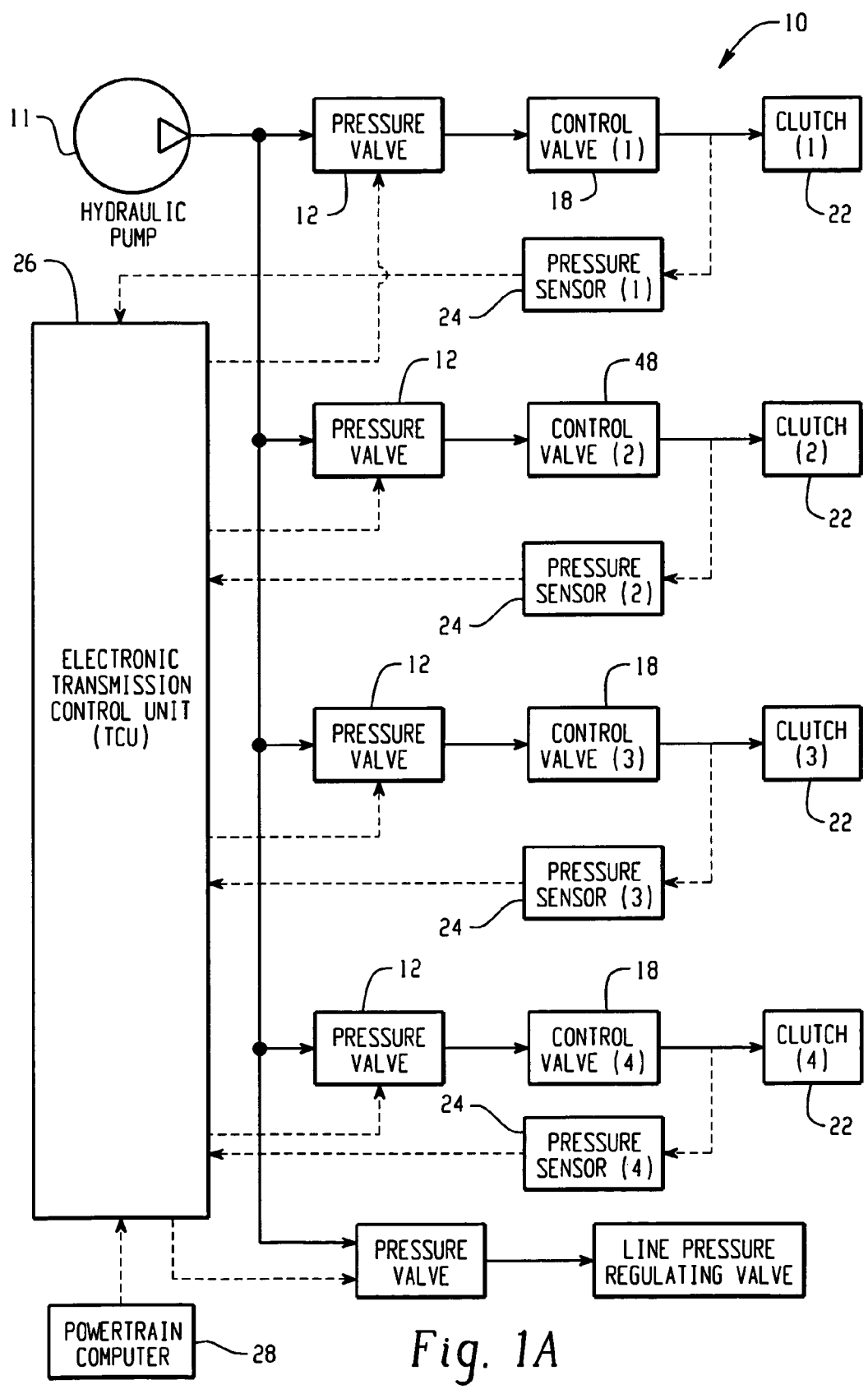
FIGS. 1A and 1B are block diagrams of a closed loop transmission control system in which a TCU according to one embodiment of the invention can be used.
Figure 1B:
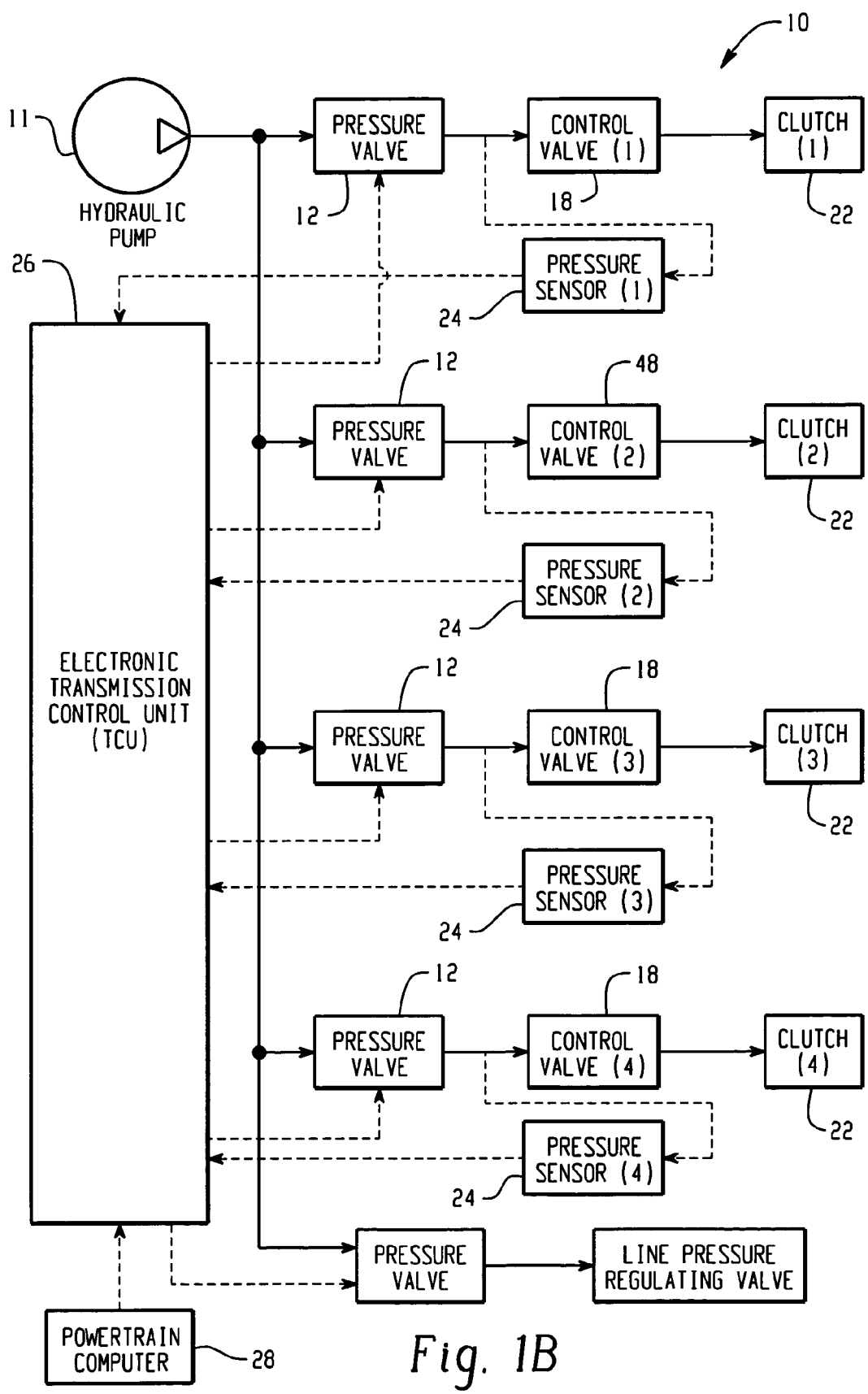

FIGS. 1A and 1B are representative block diagrams illustrating a closed-loop pressure control system 10 for a vehicle transmission in which a pressure transducer package according to the invention can be used. The system 10 may include a plurality of solenoid operated valves 12 supplied with pressurized hydraulic fluid from a pump 11, which may be driven by a transmission input shaft. Each valve 12 supplies pressurized fluid along a conduit to a hydraulic control valve 18, and the output of each hydraulic control valve 18 is applied through a conduit to a hydraulically actuated clutch 22, as for example, a band clutch or plate clutch, for controlling torque transmission upon a speed (gear) change.

The pressure supplied to each clutch (FIG. 1A) or to each control valve (FIG. 1B) along the clutch's respective conduit 20 is sensed by a pressure transducer 24, which provides an electrical indication of the sensed pressure, as shown by a dashed line in FIGS. 1A and 1B, to an electronic transmission control unit (TCU) 26. The TCU 26 also receives an input in the form of a command pressure signal from a powertrain computer 28 that is programmed to provide the desired shift characteristics for the particular vehicle and engine-transmission combination. The pressure transducers 24 may comprise any appropriate pressure sensor, such as a piezoelectric sensor.

In the inventive structure, one or more pressure transducers 24 are incorporated into a unitary package 30 that can be easily incorporated into the transmission system 10 (e.g., by attachment to the TCU 26). FIGS. 2A through 2E are representative section views showing various embodiments of the inventive package 30 and ways they may be incorporated into a transmission manifold. The package 30 may be encased in a plastic package housing 31 (FIGS. 3A though 5) for easy handling and protection.

As is known in the art, the TCU includes a manifold 50 having internal pressure ports 52. In the illustrated embodiment, the package housing 31 sits on top of the manifold 50 and the transducers 24 are disposed in the package 30, allowing the transducers 24 to be oriented above the manifold 50. However, the package housing 31 may also be configured to sit on top of or be embedded in a TCU housing or a plate that is disposed on the manifold 50. Alternatively, reference numeral 31 may be treated as the TCU housing, with the transducers 24 coupled to the TCU housing rather than the package housing.

As shown in FIGS. 3A through 5, the package 30 includes a plurality of pressure transducers 24 coupled to the substrate 61, either directly or through a support, to form a single multiple-transducer package 30.

Figure 2A:
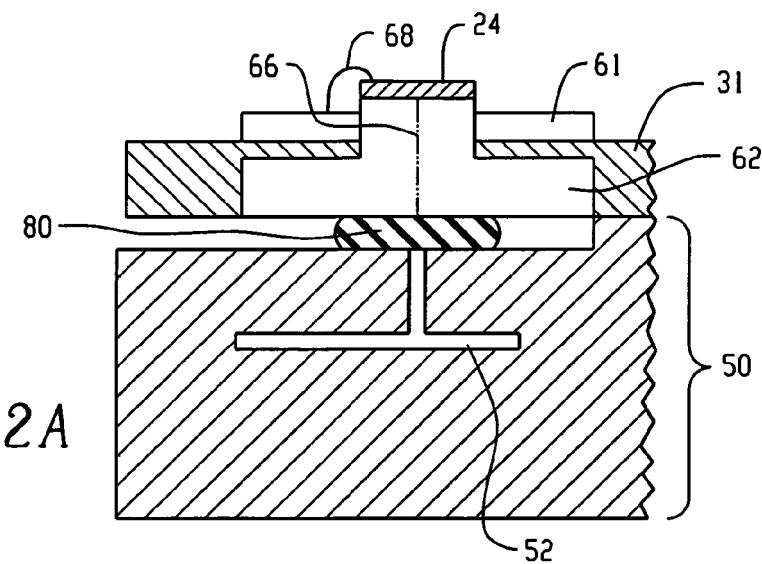
FIGS. 2A through 2E illustrate section views of various embodiments of a transducer incorporated in the inventive TCU.
Figure 2B:
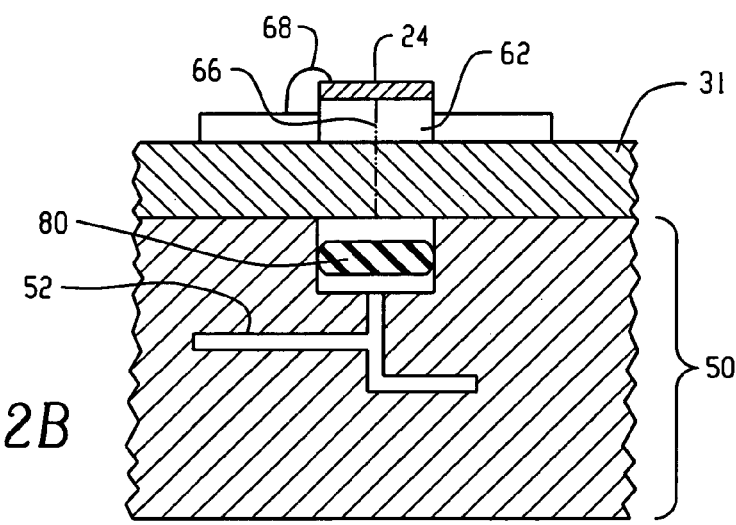
Figure 2C:
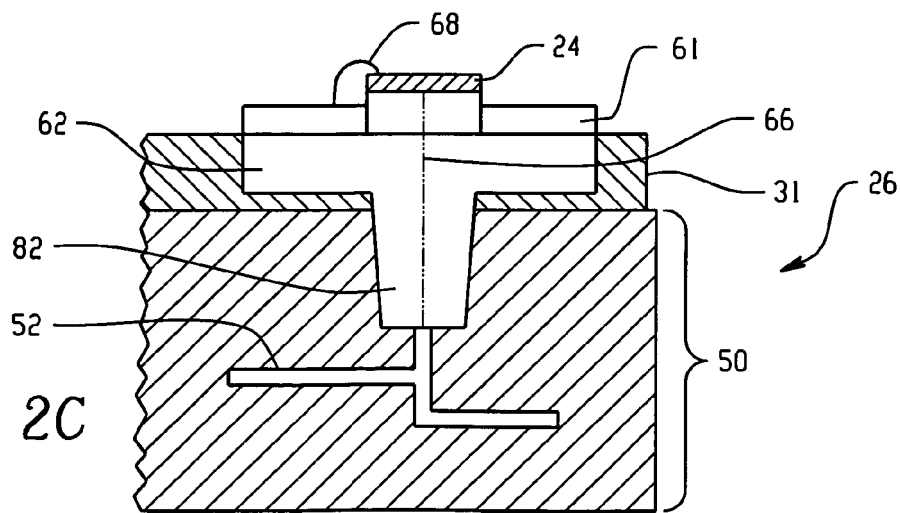

Referring to FIGS. 2A through 2C, the package 30 may include supports 62 integrated with a circuit card, a flex circuit, plated traces, or any other component acting as the substrate 61. The supports 52 may be made of glass or other insulating material. The supports 62 have their own associated support ports 66 that correspond and align with the pressure ports 52 in the manifold 50 to form fluidic channels that allow fluid in the pressure ports 52 to reach the transducers 24 when the package 30 is incorporated into the transmission system 10. As a result, the transducers 24 can generate an output based on the fluid pressure detected at its associated pressure port 52. Alternatively, the supports 62 are omitted so that the transducers 24 are disposed directly on the substrate 61, without any other component acting as the interface between the transducer 24 and the substrate 61. In this case, the pressure ports 52 communicate directly with the transducers 24.

Figure 4:
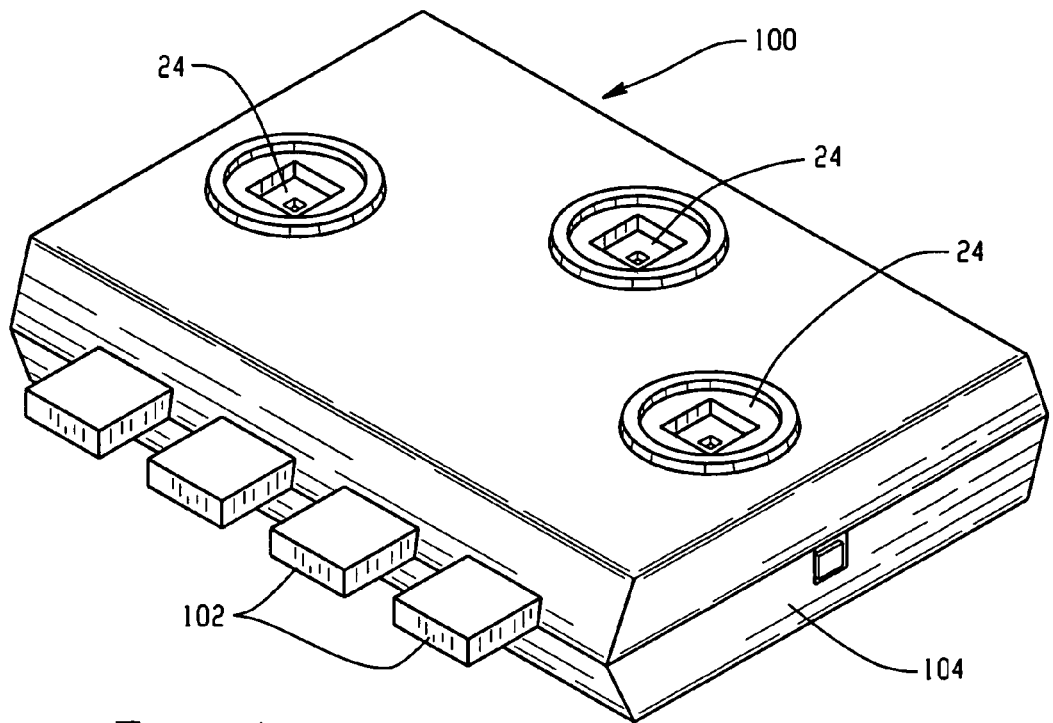
FIG. 4 is a representative top perspective view of a sub-package to be used in a TCU according to another embodiment of the invention.
Figure 5:
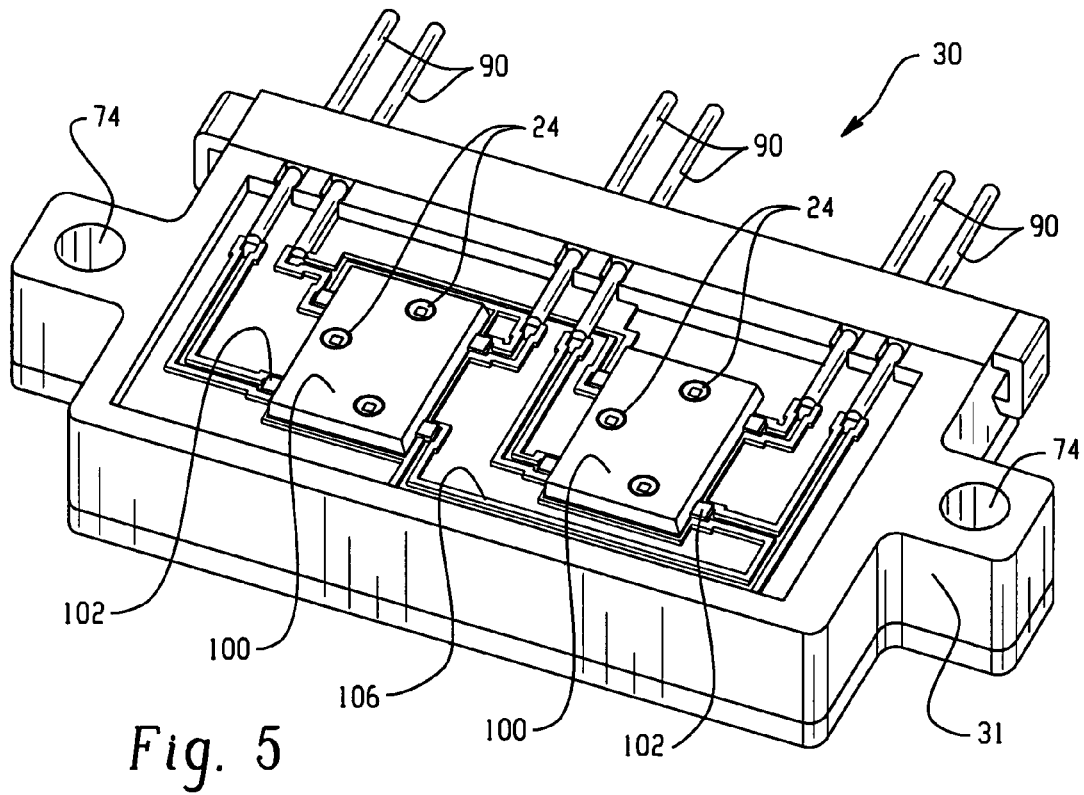
FIG. 5 is a representative top perspective view of a package incorporating the sub-package shown in FIG. 4.

The TCU 26 also includes a processor 70, such as a microprocessor or ASIC. The processor 70 may either be incorporated in the package 30 (e.g., disposed on the substrate 61, as shown in FIGS. 3 through 5) or be the processor for the TCU 26 itself. In this example, a wire bond 68 connects each pressure transducer 24 to a corresponding electrical contact point 58 on the substrate 61 so that signals from the pressure transducer 24 can be routed elsewhere. Signals and current are routed between the TCU 26, the transducers 24, and the processor 70 via any desired signal communication interface, such as a lead frame, stamped metal traces, flex-circuits, plated circuits, a wire harness, wireless means, etc. Note that in some embodiments, the same component (e.g., the lead frame, etc.) will act as both the substrate 61 and the signal communication interface.

Regardless of the specific package configuration 30, the alignment between the pressure ports 52 and the transducers 24 allows the package 30 to be retrofitted into any pre-existing transmission system, if desired. This allows the package 30 to be easily manufactured separately from the TCU 26 and be attached to the TCU 26 without having to reconfigure the manifold 50 to accommodate the package 30.

FIG. 2A shows one embodiment where the support 62 in the package 30 is embedded in the housing 31 of the inventive package 30. To prevent fluid leakage, a sealing structure may be included around the pressure port 52. In the embodiment shown in FIG. 2A, an O-ring 80 acts as the sealing structure and is wedged between the manifold 50 and the support 58 to fluidically seal the pressure port 52. Those of ordinary skill in the art will understand that other sealing structures, such as gasket material, may be used without departing from the scope of the invention.

An O-ring 80 is also used in the embodiment of FIG. 2B, but in this case the O-ring 80 is wedged into a depression 72 in the manifold 50. Note that in FIG. 2B, the support 62 and the circuit card 64 are disposed on top of the package housing 31 rather than being embedded in it. Like the embodiment shown in FIG. 2A, the arrangement of the transducers 24 on the circuit card 64 in this embodiment can be adjusted to correspond with the configuration of the pressure ports 52 in the manifold 50.

FIG. 2C shows an alternative sealing structure that does not require a separate O-ring. Instead, the support 58 has a tapered (e.g. frusto-conical) extension 82 or similar integral structure. When the support 58 is embedded into the package housing 31, the extension 82 extends out of the package 30 below the housing 31 into the manifold 50 to form a press-fit, fluid-tight seal around the pressure port 52. Like the embodiment of FIG. 2B, this embodiment allows the package 30 to be manufactured separately and attached to the TCU 26 in a modular fashion.

Although FIGS. 2A through 2C show the transducers 24 disposed above the top surface of the substrate 61, those of ordinary skill in the art will understand that the transducers 24 may be disposed on or below the bottom surface of the substrate 61 as well without departing from the scope of the invention.

Figure 2D:
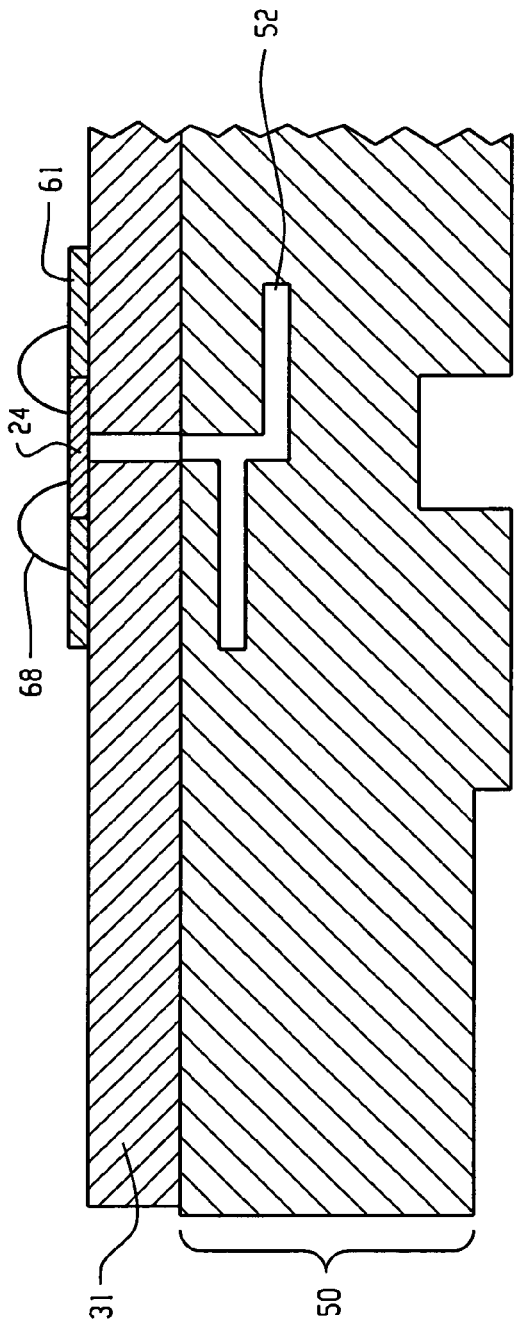

FIG. 2D shows an alternative structure wherein the pressure transducer 24 is disposed on the substrate 61 so that the transducer 24 can be bonded or mechanically fastened so that it communicates directly with the pressure ports 52 (e.g., bonded or mechanically fastened to the housing 31). This may be accomplished by, for example, placing the transducer 24 on an underside of the substrate 61 or embedding the transducer 24 in the substrate 61 to leave the transducer 24 exposed for interfacing with the pressure port 52. The wire bonds 68 are then connected via the wire bonds 68 to the communication interface, such as a flex circuit or traces plated directly on the TCU 26, or on an insulated interface. In this embodiment, the transducer 24 communicates directly with the pressure port 52. Note that although the embodiment in FIG. 2D shows the transducer 24 incorporated in the substrate 61, the package may also allow direct contact between the transducer 24 and the pressure port 52 by mounting the transducer 24 to the underside of the substrate 61.

Figure 2E:
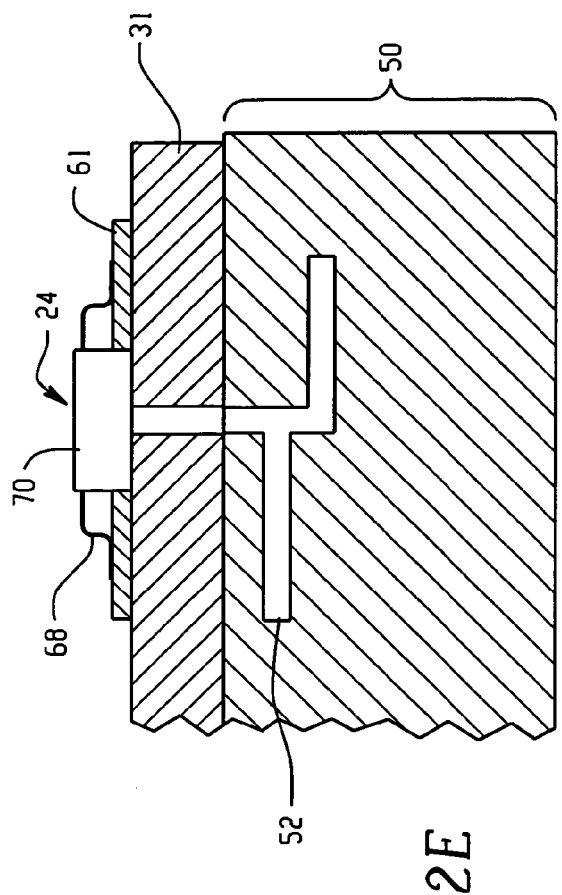

FIG. 2E shows an alternative structure where the pressure transducer 24 is disposed inside an individual transducer housing 70. The housing 70 may then directly bonded to the TCU or a subcarrier (e.g., the package housing 31) and the wire bonds 68 are bonded out to a communication interface on the TCU or on an insulated interface.

Note that although FIGS. 2D and 2E do not show a sealing structure, those of ordinary skill in the art will understand that any of the sealing structures shown in FIGS. 2A through 2C may be incorporated into the embodiments of FIGS. 2D and 2E without departing from the scope of the invention.

Regardless of the specific orientation of the transducers 24, wire bonds or package leads 68 route signals generated by the transducer(s) 24 to a communication interface (not shown) on the substrate 61, such as a flex-circuit or plated traces, which in turn route the signals to the processor 70 that processes the transducer signals.

By configuring the package 30 so that the transducers 24 are together in a single device itself rather than discrete components scattered throughout the transmission system 10, the invention shortens the signal path between the manifold 50 and the transducers 24 and between the transducers 24 and the processor 70 reducing the complexity of the overall transmission control system and making it less sensitive to noise.

If the inventive package 30 is incorporated in a TCU 26, the package 30 may use a pre-existing processor in the TCU 26 to process the transducer signals, if desired. Also, the transducers 24 may be configured in any desired fashion with the package 30.

FIGS. 3A through 5 show possible transducer arrangements in the package 30. Note that invention is not limited to these configurations and that other configurations are possible without departing from the scope of the invention. The package 30 can be built using any of the structures shown in FIGS. 2A through 2E. As noted above, the package 30 is manufactured separately from the manifold 50 and can be connected to the manifold 50 by a harness, lead frame, or any other connector.

Figure 3A:
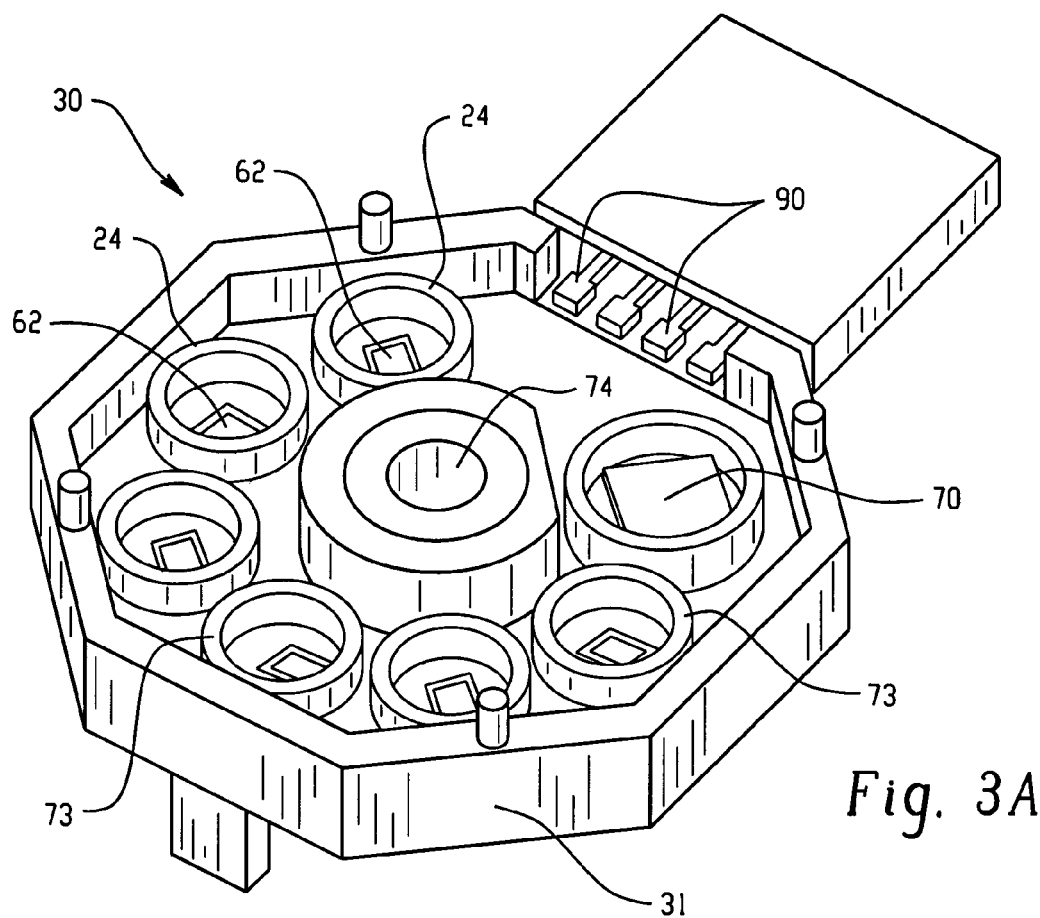
FIGS. 3A and 3B are representative top and bottom views of a package used in a TCU according to one embodiment of the invention.
Figure 3B:
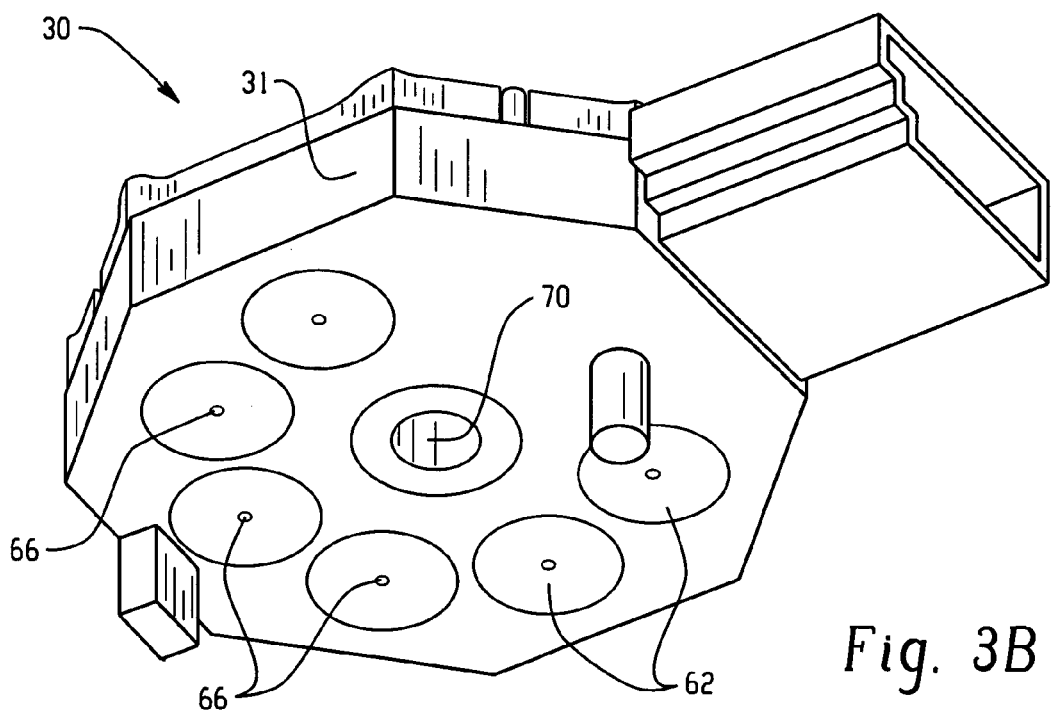
Figure 6:
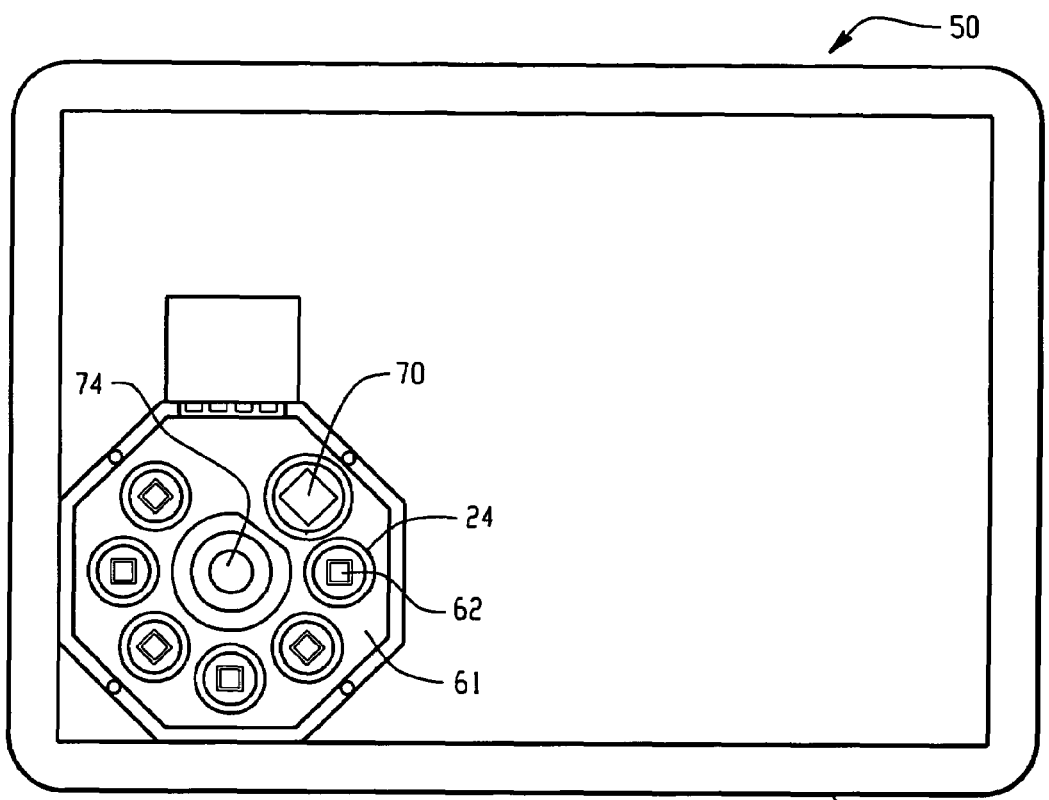
FIG. 6 is a representative top view of a TCU using the package of FIG. 4 embodiment of the invention.

FIGS. 3A and 3B illustrate a package configuration where the transducers 24 are arranged roughly in a circular or hexagonal shape on their respective substrates 61. The transducers 24 and the processor 70 are housed in the package housing 31. Optional dams 73 or filler material may be included in the package 30 to stabilize the transducers 24 and processor 70 to prevent them from becoming jarred loose over time. The package housing 30 may also include a bolt hole 74 to allow the package 30 to be attached easily to the manifold 50 with a single bolt, as shown in FIG. 6.

Because the transducers 24 and processor 70 are grouped together in a single package 30, only four connection lines 90 (i.e., data, clock, power and ground) are needed to connect the transducers 24 to the TCU 26. This reduces the overall length of the traces between the processor 70 and the transducers 24 and reduces the total number of connections to the TCU 26, making the overall pressure sensing system more noise-resistant. Further, the package 30 acts as a modular component that can be attached to any manifold without reconfiguration of the manifold itself.

Figure 7:
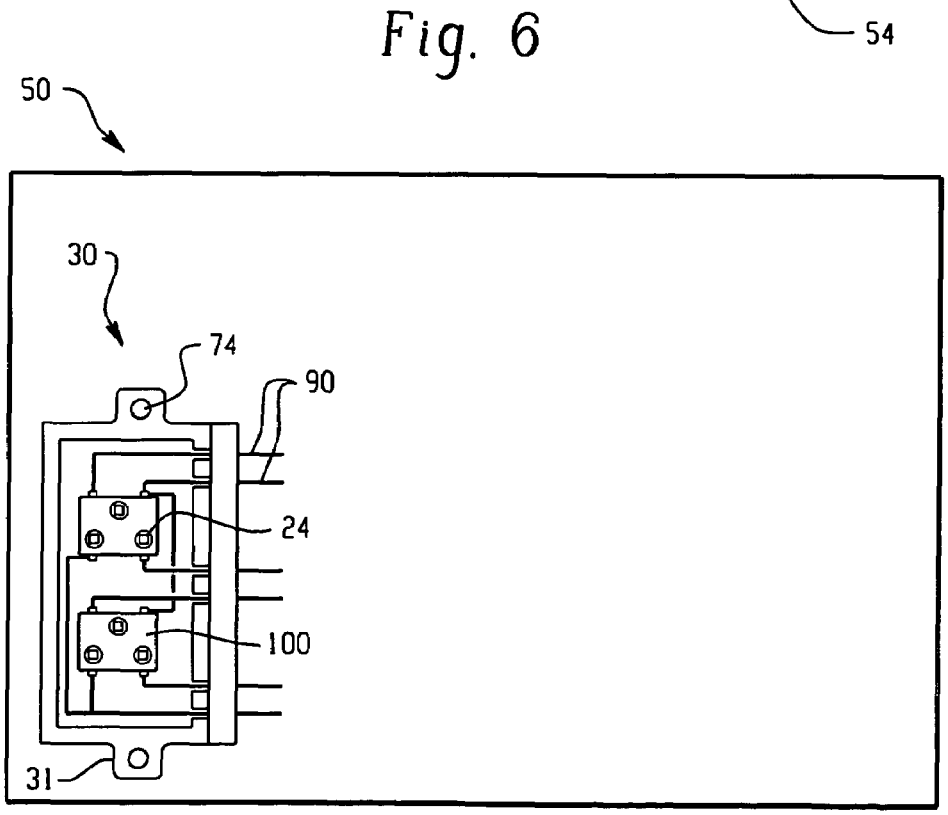
FIG. 7 is a representative top view of a TCU according to a further embodiment of the invention.

FIGS. 4 and 5 illustrate another embodiment where the package 30 includes one or more sub-packages 100. FIG. 4 shows one embodiment of the sub-package 100. The sub-package 100 includes two or more of the transducers 24 and its own associated sub-package lines 102 and sub-package housing 104. As shown in FIG. 5, two or more of the sub-packages 100 are disposed in the package housing 31 to form the complete package 30. The sub-package lines 102 are coupled to package traces 104, which are in turn connected to the connection lines 90. In the example shown in FIG. 5, each sub-package 100 has its own data and clock connection lines, and the two sub-packages share power and ground lines. In this example, the package housing 31 includes two bolt holes 74 for attaching the package 30 to the TCU 26, as shown in FIG. 7. Multiple packages 30 may be attached to the TCU 26 to obtain a desired number of transducers 24 in the TCU 26.

Note that the sub-packages 100 may be calibrated before they are assembled into the package 30. This makes it possible for different entities to manufacture the sub-package 100 and the finished package 100.

The arrangements described above are simply illustrative examples of possible embodiments. Those of ordinary skill in the art will understand that the package can have different configurations without departing from the scope of the invention. Further, although the above examples focus on a transmission manifold, those of ordinary skill in the art will see that the inventive package can be used in any fluid pressure sensing system.

By incorporating one or more transducers and a processor into a single package, the inventive TCU has fluid pressure monitoring and control capabilities without requiring reconfiguration of the entire transmission manifold. Instead, fluid in the manifold can simply be redirected to the inventive package using, for example, an adapter plate that re-routes fluid to the transducers.

Although the invention has hereinabove been described with respect to the illustrated embodiments, it will be understood that the invention is capable of modification and variation and is limited only by the following claims

What is claimed is:

1. A transmission control unit (TCU) comprising:
   a manifold having a plurality of pressure ports;
   a housing associated with one of the manifold and the TCU;
   a processor; and
   a package coupled to the manifold, the package configured for connection to a transmission system and having
      a plurality of transducers, each transducer arranged to correspond with one of the plurality of pressure ports, wherein each transducer generates a signal corresponding to fluid pressure in one of the plurality of pressure ports;
      at least one substrate that carries at least two of the plurality of transducers and the processor and that is attached to the housing; and
      a signal communication interface that routes signals between the plurality of transducers, the processor and the TCU.

2. The TCU of claim 1, wherein the substrate is one selected from the group consisting of a circuit card, a flex-circuit, and plated traces.

3. The TCU of claim 1, wherein the signal communication interface is one selected from the group consisting of a lead frame, stamped metal traces, flex-circuits, plated circuits, a wire harness, and a wireless means.

4. The TCU of claim 1, further comprising at least one support coupling the plurality of transducers to the substrate.

5. The TCU of claim 4, wherein said at least one support has at least one support port that aligns with at least one of said plurality of pressure ports.

6. The TCU of claim 4, wherein said at least one support is made from an insulating material.

7. The TCU of claim 4, wherein said at least one support is embedded in the housing.

8. The TCU of claim 4, further comprising at least one sealing structure disposed in the manifold to seal at least one of said plurality of pressure ports.

9. The TCU of claim 8, wherein the sealing structure is an O-ring disposed in a depression in the manifold.

10. The TCU of claim 8, wherein the sealing structure is an O-ring wedged between the support and the manifold.

11. The TCU of claim 8, wherein the sealing structure is an extension from the support that extends below the housing, wherein the extension is press-fitted into the manifold.

12. The TCU of claim 4, wherein said at least one support has a support port, wherein the support ports in the package couple with the plurality of pressure ports to form a plurality of fluid channels that can carry fluid to the plurality of transducers.

13. The TCU of claim 1, wherein the plurality of transducers are attached to the housing of the TCU.

14. The TCU of claim 1, further comprising at least one transducer housing surrounding at least one of said plurality of transducers, wherein said at least one transducer housing is attached to the housing of the TCU.

15. The TCU of claim 1, wherein the processor is disposed inside the package.

16. A method of manufacturing a transmission control system having a transmission control unit (TCU) having a housing and a manifold with a plurality of pressure ports, the method comprising:

coupling a plurality of pressure transducers with at least one substrate to form a package configured for connection to a transmission system;

aligning the plurality of pressure ports with the plurality of transducers so that each transducer is in communication with one of the plurality of pressure ports;

forming a housing associated with one of the manifold and the package;

attaching the package to to TCU;

disposing a processor that receives the signals from the plurality of transducers; and incorporating a signal communication interface that routes signals between the plurality of transducers, the processor, and the TCU.

17. The method of claim 16, wherein the step of coupling the plurality of pressure transducers comprises attaching said plurality of transducers directly to said at least one substrate.

18. The method of claim 16, wherein the step of coupling the plurality of pressure transducers comprises: connecting a plurality of supports to said at least one substrate; and connecting the plurality of transducers to the plurality of supports.

19. The method of claim 18, further comprising incorporating the plurality of supports into at least one of the housing and the manifold of the TCU.

20. The method of claim 16, further comprising incorporating at least one scaling structure in the TCU to seal at least one of said plurality of pressure ports.

21. The method of claim 16, wherein the step of disposing the processor comprises disposing the processor in the package.

* * * * *